(12) United States Patent
Marukawa et al.

(10) Patent No.: US 8,178,229 B2
(45) Date of Patent: May 15, 2012

(54) EXHAUST SYSTEM AND BATTERY PACK

(75) Inventors: Shuhei Marukawa, Toyohashi (JP);
Masahiro Misu, Nissin (JP); Toyohiko Eto, Toyota (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 1259 days.

(21) Appl. No.: 11/866,893

(22) Filed: Oct. 3, 2007

(65) Prior Publication Data
US 2008/0085445 A1     Apr. 10, 2008

(30) Foreign Application Priority Data
Oct. 6, 2006   (JP) ................. 2006-274809

(51) Int. Cl.
*H01M 2/12*   (2006.01)
*H01M 2/10*   (2006.01)
(52) U.S. Cl. ........................................ 429/96; 429/82
(58) Field of Classification Search ............ 429/82, 429/96
See application file for complete search history.

(56) References Cited

U.S. PATENT DOCUMENTS

| 4,332,187 A * | 6/1982 | Imai et al. ............... 454/147 |
| 6,541,151 B2 * | 4/2003 | Minamiura et al. ........ 429/98 |
| 2003/0082438 A1 * | 5/2003 | Kwon ..................... 429/120 |

FOREIGN PATENT DOCUMENTS

| JP | 61-64523 A | 4/1986 |
| JP | 2004-243855 A | 9/2004 |

* cited by examiner

*Primary Examiner* — Lore Jarrett
(74) *Attorney, Agent, or Firm* — Christensen O'Connor Johnson Kindness PLLC

(57) ABSTRACT

Noise generated from some air leaking from a water drain hole formed in an exhaust duct is reduced. A first water drain hole for exhausting liquid that has collected within the exhaust duct to outside the exhaust duct is formed in a bottom face of the exhaust duct for exhausting air after cooling a battery stack and a second water drain hole for exhausting liquid, which was exhausted from the first water drain hole, to outside a lower case is formed in the lower case housing the battery stack and the exhaust duct, with the second water drain hole formed at a position not on a line extending from the direction of outflow of air leaking out from the first water drain hole.

5 Claims, 6 Drawing Sheets

EXHAUST SYSTEM AND BATTERY PACK

PRIORITY INFORMATION

This application claims priority to Japanese Patent Application No. 2006-274809 filed on Oct. 6, 2006, which is incorporated herein by reference in its entirety.

BACKGROUND OF THE INVENTION

1. Field of the Invention

The present invention relates to a configuration of water drain holes formed in an exhaust duct for exhausting gases, such as air.

2. Description of the Related Art

Heretofore, electric vehicles, hybrid electric vehicles, and fuel cell vehicles were equipped with a battery pack for storing electric power to supply a drive motor. The battery pack includes an exhaust duct for exhausting air that blows in via an air inlet for cooling a battery stack formed by combining multiple battery modules.

FIG. 7 shows a case structure of a conventional battery pack. A battery case, which is a case for a battery pack 100, includes an upper case 12 for covering the upper part of the battery stack and a lower case 14 for covering the lower part. Built into the battery pack 100 is a battery stack having battery modules formed from one or multiple cells, such as nickel-metal hydride battery or lithium ion battery, having cooling passages located between them in parallel, assembled by binding between end members located at both ends, and having the battery modules electrically connected in series. Furthermore, a cooling fan is provided inside the battery pack 100 at one end in the longitudinal direction (x direction) of the battery pack 100. An air inlet 16 is provided on one side of the battery pack 100 and an outlet 18 is provided on the other side of the battery pack 100 near the cooling fan. When the cooling fan is rotationally driven, air within the passenger compartment is taken in from the air inlet 16. The cooling air that is taken in is supplied to a chamber space formed between the battery stack and the lower case 14, flows from the bottom of the battery stack to the top via cooling passages between battery modules, passes a chamber space formed between the battery stack and the upper case 12, and further reaches an exhaust duct 150 via the cooling fan and is exhausted to the outside from the outlet 18.

When the cooling air is compressed by the cooling fan, the water vapor contained in the cooling air liquefies. Namely, the cooling air exhausted by the cooling fan contains moisture. To exhaust the liquid, such as moisture, that collects in the exhaust duct 150 to outside the battery pack 100, water drain holes are formed in the bottom face of the exhaust duct 150 and in the lower case 14.

FIG. 8 shows a perspective view of the conventional exhaust duct 150. Furthermore, FIG. 9 shows a cross section of part of the battery pack 100 as viewed from the direction of the arrow when sliced in a vertical direction along line A-A of FIG. 7. As shown in FIG. 9, in the prior art, a water drain hole 200b in the lower case 14 is formed immediately below a water drain hole 200a in the exhaust duct 150 and liquid that collects within the exhaust duct 150 is exhausted to outside the battery pack 100 via the water drain hole 200a and the water drain hole 200b.

Aside from the liquid that is exhausted via the water drain hole 200a and the water drain hole 200b, leakage of part of the cooling air may cause turbulence in the cooling air and generate noise near the water drain holes.

Especially, in the case of a battery pack mounted in a vehicle, the noise generated by the battery pack may reach the passenger compartment. However, in recent years, the demand is high for quieter passenger compartments to accompany the higher quality of vehicles so that the demand is also high for the reduction in noise generated in the battery pack mounted in the vehicle.

Japanese Patent Laid-Open Publication No. Sho 61-64523 and Japanese Patent Laid-Open Publication No. 2004-243855 disclose a duct formed with a hole for exhausting water to the outside.

SUMMARY OF THE INVENTION

It is therefore an object of the present invention to reduce noise generated from part of the air leaking from the water drain hole formed in the exhaust duct.

An exhaust apparatus relating to the present invention has an exhaust duct for exhausting gas and a case for housing the exhaust duct. A first water drain hole for exhausting liquid that has collected within the exhaust duct to outside the exhaust duct is formed in a bottom face of the exhaust duct and a second water drain hole for exhausting the liquid that was exhausted from the first water drain hole to outside the case is formed in a bottom face of the case. The second water drain hole is formed at a position not on a line extending from the direction of outflow of gas leaking out from the first water drain hole.

A battery pack relating to the present invention has a battery stack, an exhaust duct for exhausting air after cooling the battery stack, and a case for housing the battery stack and the exhaust duct. A first water drain hole for exhausting liquid that has collected within the exhaust duct to outside the exhaust duct is formed in a bottom face of the exhaust duct and a second water drain hole for exhausting the liquid that was exhausted from the first water drain hole is formed in a bottom face of the case. The second water drain hole is formed at a position not on a line extending from the direction of outflow of air leaking out from the first water drain hole.

In one aspect of the battery pack relating to the present invention, the second water drain hole is formed at a position shifted in a direction perpendicular to the direction of passage of the air in the first water drain hole within the exhaust duct along the bottom face of the case from the position where the first water drain hole is projected onto the bottom face of the case.

In one aspect of the battery pack relating to the present invention, the second water drain hole is formed at a position shifted in a direction opposite to the direction of passage of the air at the first water drain hole within the exhaust duct along the bottom face of the case from a position where the first water drain hole is projected onto the bottom face of the case.

In one aspect of the battery pack relating to the present invention, the exhaust duct includes a curved part that curves in a surface horizontal with the direction of passage of air within the exhaust duct and the first water drain hole is formed in a bottom face of an inner side of the curved part of the exhaust duct.

The battery pack relating to the present invention has a battery stack and an exhaust duct for exhausting air taken in for cooling the battery stack and including a curved part that curves in a surface horizontal with the direction of passage of the air. A water drain hole for exhausting the liquid that has collected within the exhaust duct to outside the exhaust duct is formed in a bottom face on an inner side of the curved part of the exhaust duct.

According to the present invention, forming the second water drain hole of the case at a position not on a line extending from the direction of outflow of air leaking out together with liquid from the first water drain hole of the exhaust duct causes the flow rate resistance of the air exhausted via the first water drain hole and the second water drain hole to increase and the airflow to decrease so that the noise generated near the first water drain hole and the second water drain hole can be decreased.

DETAILED DESCRIPTION OF THE PREFERRED EMBODIMENTS

The preferred embodiment (hereinafter referred to as the embodiment) of the present invention will be described with reference to the attached drawings.

Figure 1:
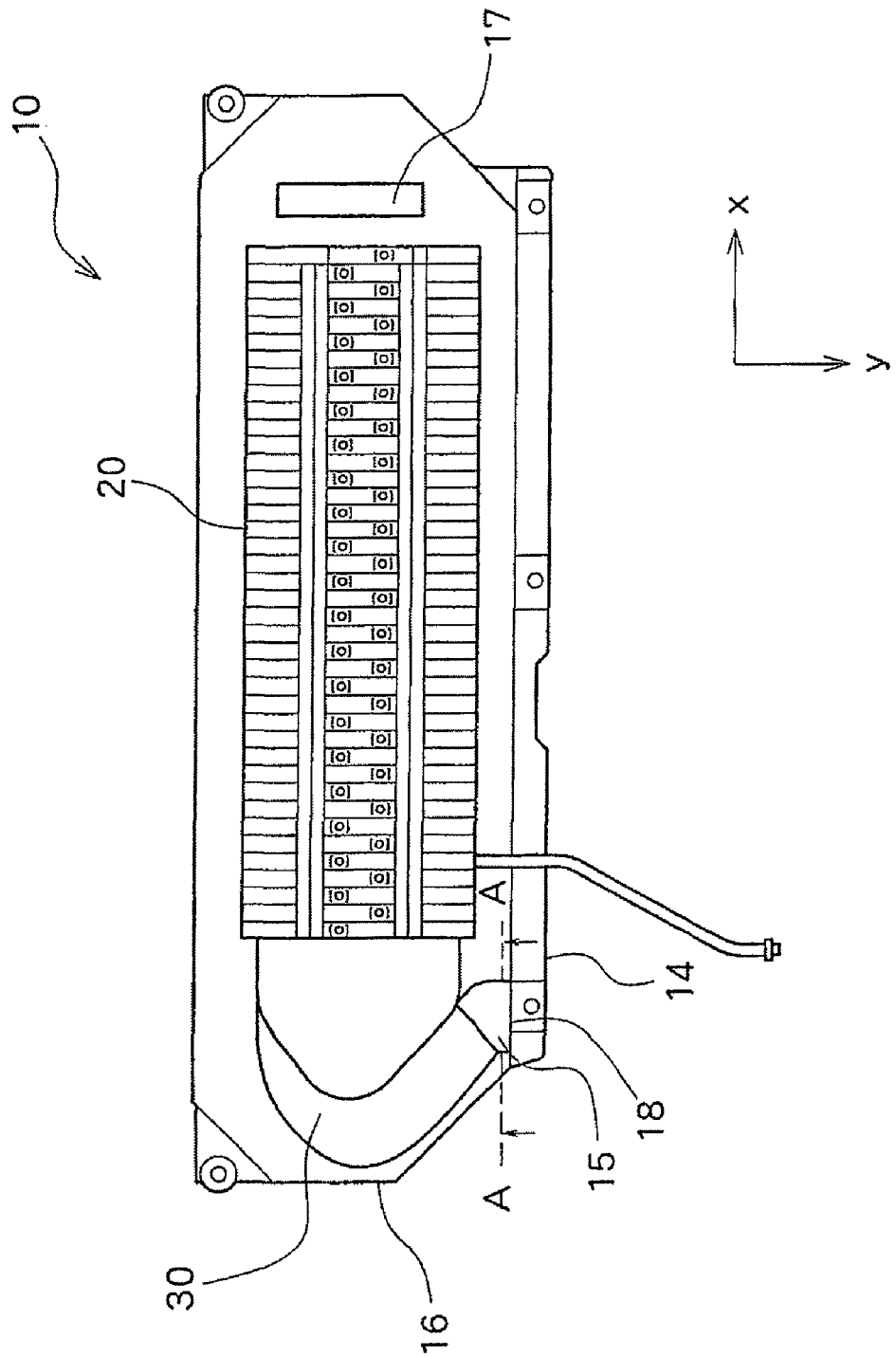
FIG. 1 shows an internal configuration of a battery pack in the embodiment with an upper case detached.
Figure 7:
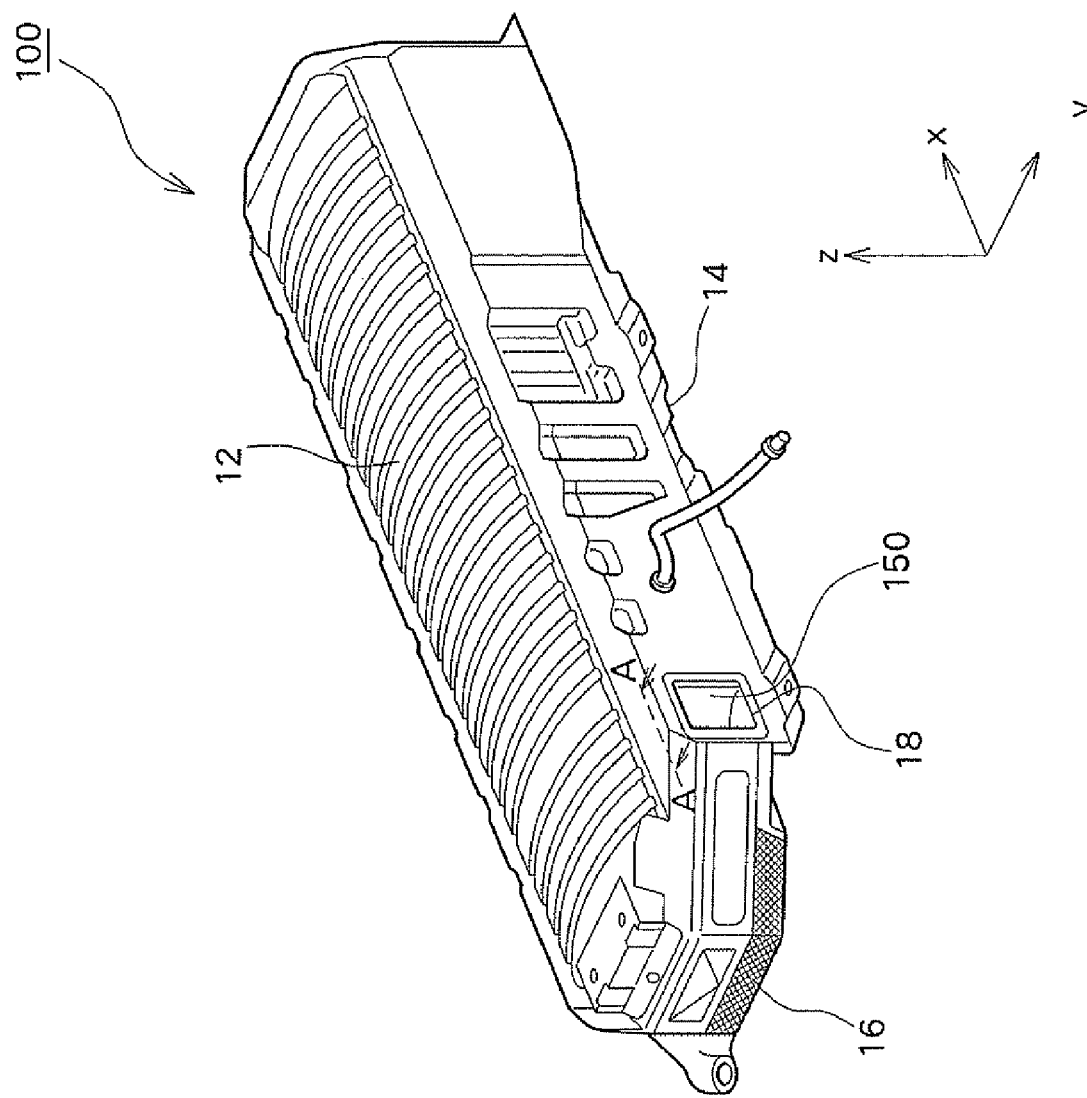
FIG. 7 shows a structure of a conventional battery pack case.
Figure 8:
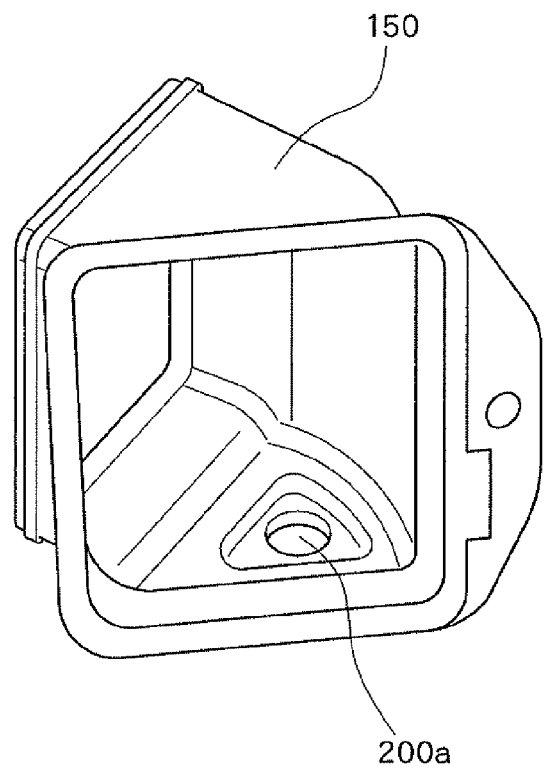
FIG. 8 is an external perspective view of a conventional exhaust duct.
Figure 9:
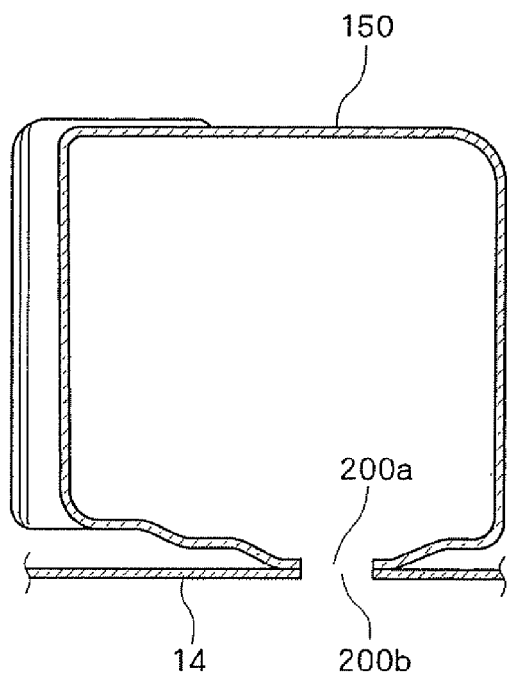
FIG. 9 shows part of a cross section of a conventional battery pack as viewed from the direction of the arrow along line A-A of FIG. 7.

FIG. 1 shows an internal configuration of a battery pack 10 with an upper case detached. Members forming the battery pack 10 identical to those forming the battery pack 100 shown in FIG. 7 and described above are designated like reference characters and their descriptions will be omitted.

Figure 2:
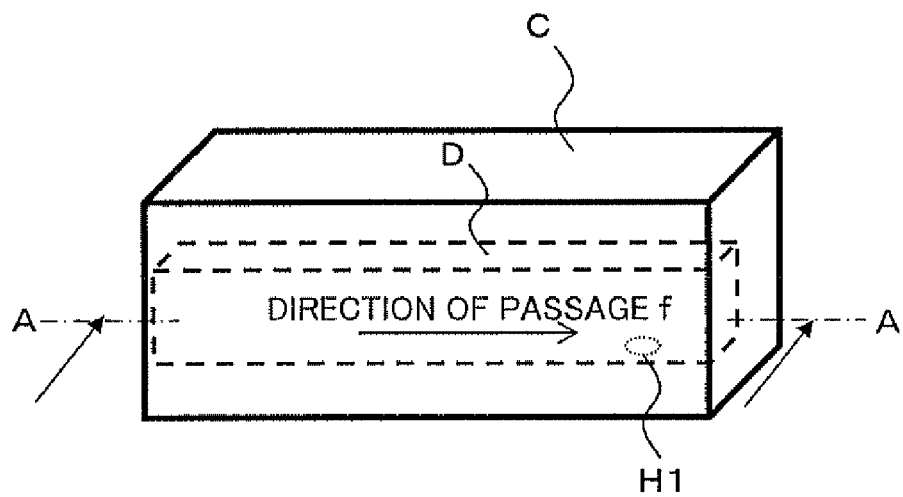
FIG. 2 illustrates a basic configuration in the embodiment.
Figure 3:
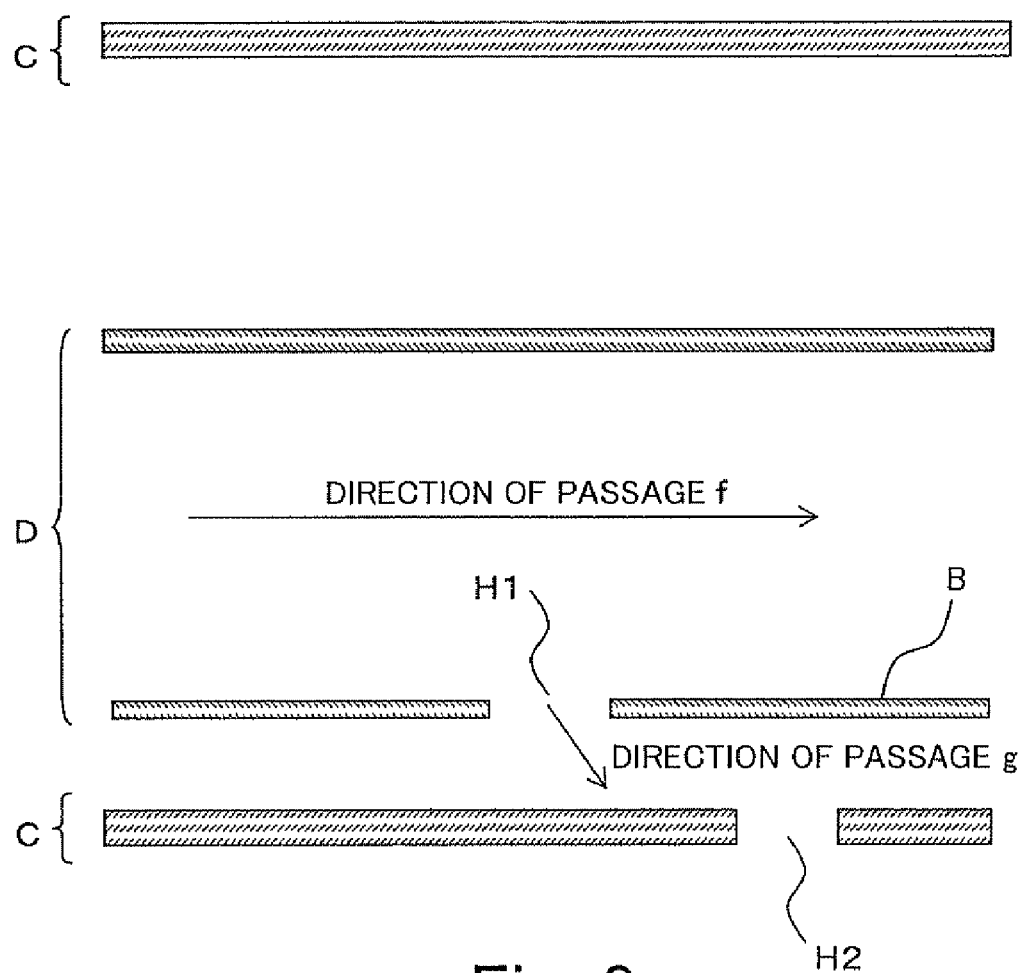
FIG. 3 illustrates a basic configuration in the embodiment.

FIG. 2-4 illustrates a basic configuration in the embodiment. The basic configuration in the embodiment will be described with reference to FIG. 2-4. To simplify the description hereinafter, an example will be given where the duct D corresponds to an exhaust duct 15 and the case C corresponds to a lower case 16 and where liquid, such as moisture, included in the air (gas) flowing from the case C to within duct D is exhausted to outside the case C.

FIG. 2 is a perspective view of case C and duct D housed in case C. FIG. 3 shows a perspective view (as viewed in the direction of the arrow along line A-A in FIG. 2) when the duct D housed in case C shown in FIG. 2 is sliced in the vertical direction along the direction of passage f of air passing within the duct D. As shown in FIG. 3, a water drain hole H1 is formed in a bottom face B of duct D. When air including moisture flows along the direction of passage f within the duct D, the air passes the water drain hole H1 and part of the air together with liquid, such as moisture, leaks out. A direction of outflow g indicates the direction of outflow of air leaking from the water drain hole H1. At this time, when the water drain hole H2 of case C is formed on a line extending from the direction of outflow g, the flow rate resistance of the air leaking out by passing the water drain hole H1 and the water drain hole H2 is relatively small and the air is exhausted to outside the case C without decreasing the flow rate of the leaking air. For this reason, turbulence of the air is likely to occur near the water drain hole H1 and the water drain hole H2 to increase noise. Conversely, if the water drain hole H2 is formed in case C at a different position avoiding the line extending from the direction of outflow g, the flow rate resistance of the leaking air passing the water drain hole H1 increases so that the flow rate of the leaking air passing the water drain hole H1 decreases by the time the water drain hole H2 is reached. Thus, the turbulence of the air generated near the water drain hole H1 and the water drain hole H2 is suppressed so that noise can be decreased.

In consideration of the aforementioned, a positional relationship between the water drain hole H1 and the water drain hole H2 making it possible to decrease noise near the water drain hole H1 and the water drain hole H2 will be further described.

Figure 4A:
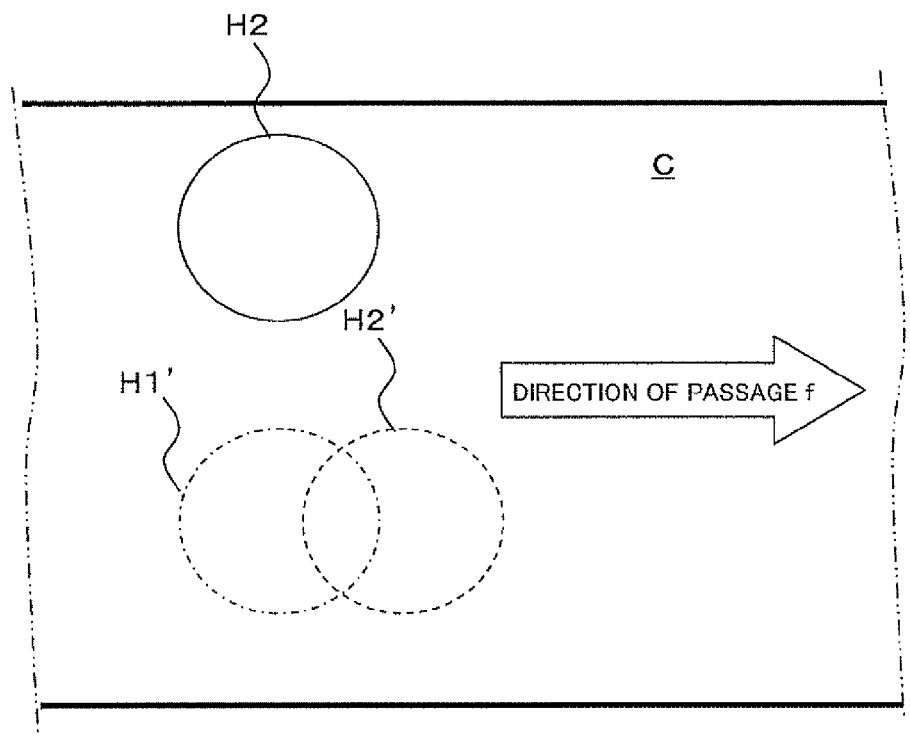
FIG. 4A illustrates a basic configuration in the embodiment.
Figure 4B:
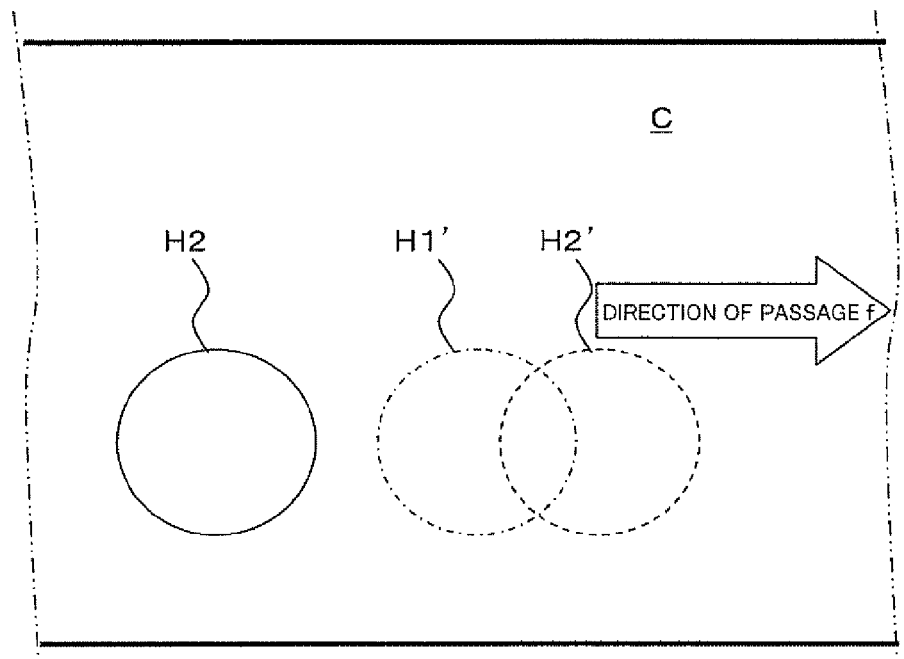
FIG. 4B illustrates a basic configuration in the embodiment.

FIGS. 4A and 4B show one example of the positional relationship between the water drain hole H1 and the water drain hole H2 when the bottom face of the case C is viewed from above. In FIGS. 4A and 4B, the dashed and dotted circle H1' indicates the position of the water drain hole H1 formed in the duct D projected vertically onto the bottom face of the case C and the dashed circle H2' indicates the position when the water drain hole H2 is formed on a line extending from the direction of outflow g. As shown in FIG. 4A, for example, the water drain hole H2 is formed after shifting in a vertical direction from the dashed and dotted circle H1' toward the direction of passage f of the air within the duct D. Furthermore, as shown in FIG. 4B, for example, the water drain hole H2 is formed after shifting to the front (or to the back) from the dashed circle H2' along the direction of passage f. If the water drain hole H2 is formed toward the back along the direction of passage f, the air leaking out from the water drain hole H2 faces a direction opposite to the direction of passage f and the flow rate resistance of the air leaking out becomes greater than when the water drain hole H2 is formed toward the front so that the noise can be further reduced.

As described hereinabove, by forming the water drain hole H2 in the bottom face of the case C and not on a line extending from the direction of outflow g of the air leaking out from the water drain hole H1 formed in the duct D, the flow rate resistance of the air exhausted via the water drain hole H1 and the water drain hole H2 increases so that the flow rate of the exhausted air decreases and the noise generated near the water drain hole H1 and the water drain hole H2 can be decreased.

Next, the battery pack 10 relating to the embodiment will be described with reference to FIG. 1. The battery pack 10 relating to the embodiment has a second water drain hole 20b formed in the bottom face of the lower case 14 at a position shifted from a first water drain hole 20a formed in the bottom face of the exhaust duct 15 in a substantially vertical direction from the direction of passage of the cooling air flowing within the exhaust duct 15. However, the second water drain hole 20b may be formed on another bottom face of the lower case 14 provided the second water drain hole 20b is formed on the bottom face of the lower case 14 different from a line extending from the direction of outflow g of the air leaking out from the first water drain hole 20a.

In FIG. 1, the battery stack 20 is configured by stacking multiple battery modules along the longitudinal direction (x direction) of the battery pack 10. In the embodiment, the battery module includes an integral case, which is a covering member, and six cells separated by partitions and located within the integral case. The integral case is not particularly limited to any material and may be, for example, formed from plastic. The six cells forming the battery module are electrically connected in series within the integral case. The exhaust duct 15 and a cooling fan 30 for supplying cooling air are located at one end in the x direction of the battery stack 20. Furthermore, a control module 17 for controlling charging/discharging of the battery stack 20 is located at the other end in the x direction of the battery stack 20. The control module 17 has a microprocessor, performs data communications with a computer loaded in the vehicle, and transmits state data of the battery stack 20 to the vehicle computer as well as controls the battery stack 20 in accordance with commands from the vehicle computer.

Figure 5:
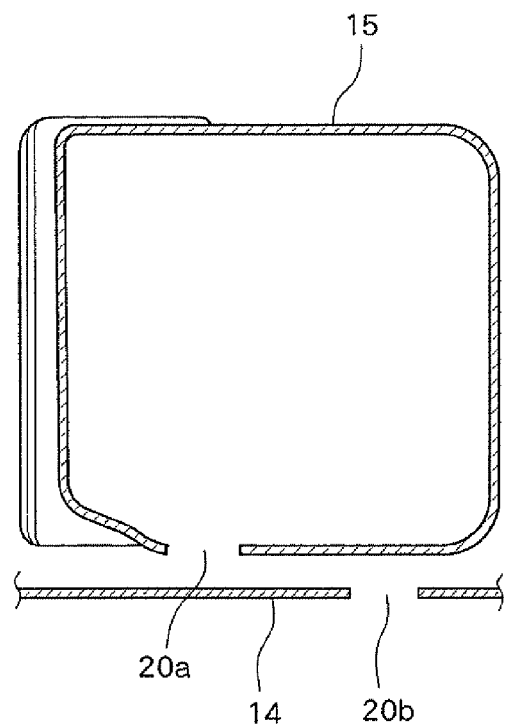
FIG. 5 shows part of a cross section of the battery pack as viewed from the direction of the arrow along line A-A of FIG. 1.

FIG. 5 shows a cross section of part of the battery pack 10 as viewed from the direction of the arrow when sliced in the vertical direction along line A-A of FIG. 1. With the direction of outflow of the cooling air leaking out from within the exhaust duct 15 via the first water drain hole 20a designated as g, the second water drain hole 20b is formed so as to avoid the line extending from the direction of outflow g. In the embodiment, the second water drain hole 20b to be formed in the bottom face of the lower case 14 is formed at a position shifted in a direction perpendicular to the direction of passage f of the cooling air flowing within the exhaust duct 15 from the first water drain hole 20 formed in the bottom face of the exhaust duct 15. By forming the second water drain hole 20b at this position, the cooling air leaking out from the first water drain hole 20a collides with the bottom face of the lower case 14, then is exhausted to outside the battery pack 10 via the second water drain hole 20b. Thus, compared to forming the second water drain hole 20b on a line extending from the direction of outflow g, the flow rate of the cooling air leaking out from the first water drain hole 20a weakens so that noise due to turbulence of the cooling air generated near the first water drain hole 20a and the second water drain hole 20b can be reduced.

To efficiently exhaust the liquid, which was exhausted to outside the exhaust duct 15 via the first water drain hole 20a, to outside the battery pack 10, it is preferable to have the second water drain hole 20b near the first water drain hole 20a and not on a line extending from the direction of outflow of gases leaking out from the first water drain hole 20a.

Figure 6:
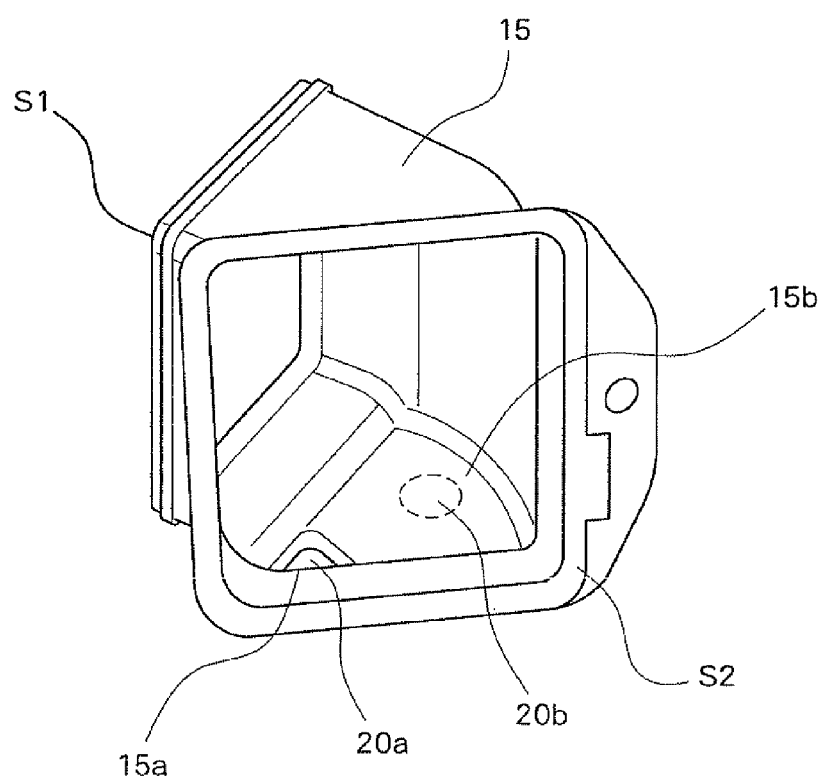
FIG. 6 is an external perspective view of an exhaust duct relating to the embodiment.

FIG. 6 is an external perspective view of the exhaust duct 15. An end surface S1 to become an inlet for the cooling air of the exhaust duct 15 is connected to an outlet of the cooling air provided on the cooling fan 30, an end surface S2 at the other end to become an outlet for the cooling air of the exhaust duct 15 is connected to the outlet 18 provided on one side of the battery pack 10, and the cooling air from the cooling fan 30 is exhausted from the end surface S2 of the exhaust duct 15 in a vertical direction (y direction) with respect to the plane including the outlet 18. As shown in FIG. 6, due to the exhaust duct 15 connecting to the exhaust port of the cooling fan 30 and the outlet 18 provided on the battery pack 10, a curved part is included in the horizontal surface in the direction of passage f of the cooling air flowing within the exhaust duct 15. In this manner, when the exhaust duct 15 has a curved shape, the flow rate of the cooling air is slower at an inner side 15a of the curved part than at an outer side 15b of the curved part. Namely, noise generated by turbulence of the air leaking out from the first water drain hole 20a can be further reduced by forming the first water drain hole 20a in the inner side 15a of the curved part rather than forming the first water drain hole 20a in the outer side 15b of the curved part. As shown in FIG. 6, it is preferable to form the first water drain hole 20a in the bottom face of the inner side 15a of the curved part of the exhaust duct 15.

In the embodiment described hereinabove, the second water drain hole 20b is formed in the bottom face of the lower case 14 and not on a line extending from the direction of outflow g of the cooling air leaking out from the first water drain hole 20a formed in the bottom face of the exhaust duct 15. As a result, liquid that has collected within the exhaust duct 15 can be exhausted and the flow rate of the cooling air passing the first water drain hole 20a and the second water drain hole 20b decreases so that the noise generated by the cooling air creating turbulence while being exhausted via the first water drain hole 20a and the second water drain hole 20b can be reduced.

Furthermore, in the embodiment, the first water drain hole 20a is formed in the bottom face of the inner side 15a of the curved part of the exhaust duct 15. As a result, the noise generated by the turbulence of the air leaking out from the first water drain hole 20a can be reduced compared to when forming the first water drain hole 20a in the outer side 15b of the curved part.

The first water drain hole 20a and the second water drain hole 20b may have identical or different shapes. Furthermore, the first water drain hole 20a and the second water drain hole 20b may have identical or different sizes.

Furthermore, also in the case where the second water drain hole 20b in the lower case 14 is formed on a line extending from the direction of outflow g of the cooling air leaking out from the first water drain hole 20a that is formed in the bottom face of the exhaust duct 15, by forming the first water drain hole 20a in the bottom face of the inner side 15a of the curved part of the exhaust duct 15, the noise generated from turbulence of the air leaking out from the first water drain hole 20a can be reduced to some extent.

Furthermore, to efficiently exhaust the liquid, which is exhausted to outside the exhaust duct 15 via the first water drain hole 20a, to outside the battery pack 10 via the second water drain hole 20b, the bottom face of the lower case 14 may be shaped at an angle so that the position of the second water drain hole 20b is lower than the position of the other bottom face of the lower case 14.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An exhaust apparatus comprising:
   an exhaust duct for exhausting air;
   a case enclosing said exhaust duct;
   a first water drain hole on a bottom face of said exhaust duct, said first water drain hole defining a line describing a direction of outflow of said air leaking out from said first water drain hole; and
   a second water drain hole on a bottom face of said case; wherein
   said second water drain hole is formed at a position not on said line defined by said first water drain hole;
   said exhaust duct includes a curved part having a curved inner side and a curved outer side and a horizontal bottom face between said inner and outer sides; and
   said first water drain hole is formed on said bottom face of said curved inner side of said curved part of said exhaust duct.

2. A battery pack comprising:
   an exhaust duct for exhausting air after cooling said battery stack;
   a case enclosing said battery stack and said exhaust duct;

a first water drain hole on a bottom face of said exhaust duct, said first water drain hole defines a line describing a direction of outflow of air leaking out from said first water drain hole; and a second water drain hole on a bottom face of said case; wherein said second water drain hole is formed at a position not on said line defined by said first water drain hole;

said exhaust duct includes a curved part having a curved inner side and a curved outer side and a horizontal bottom face between said inner and outer sides; and said first water drain hole is formed on said bottom face of said curved inner side of said curved part of said exhaust duct.

3. The battery pack according to claim 2, wherein:

said exhaust duct defines a direction of passage of air within said exhaust duct passing over said first water drain hole; and said second water drain hole is positioned on the case laterally with respect to said direction of passage of air and said first water drain hole on the exhaust duct.

4. The battery pack according to claim 2, wherein:

said exhaust duct defines a direction of passage of air within said exhaust duct, wherein said air flows from a proximal back side of said first water drain hole to a distal front side of said first water drain hole; and said second water drain hole is positioned on the case proximally with respect to said direction of passage of air and said back side of said first water drain hole on the duct.

5. A battery pack comprising:

a battery stack;

an exhaust duct for exhausting air taken in for cooling said battery stack and including a curved part having a curved inner side and a curved outer side and a horizontal bottom face between said inner and outer sides; and a water drain hole for exhausting liquid that has collected within said exhaust duct to outside said exhaust duct is formed on said bottom face of said curved inner side of said curved part of said exhaust duct.

* * * * *

UNITED STATES PATENT AND TRADEMARK OFFICE
CERTIFICATE OF CORRECTION

PATENT NO. : 8,178,229 B2  
APPLICATION NO. : 11/866893  
DATED : May 15, 2012  
INVENTOR(S) : S. Marukawa et al.

It is certified that error appears in the above-identified patent and that said Letters Patent is hereby corrected as shown below:

COLUMN  LINE

In the Claims:

| 6 | 65 | "cooling said battery stack" should read --cooling a |
| (Claim 2, | line 2) | battery stack-- |

Signed and Sealed this  
Sixteenth Day of July, 2013

Teresa Stanek Rea  
*Acting Director of the United States Patent and Trademark Office*